United States Patent
Wu et al.

(10) Patent No.: US 8,471,536 B2
(45) Date of Patent: Jun. 25, 2013

(54) SWITCH CONTROLLER FOR SWITCHING POWER SUPPLY AND METHOD THEREOF

(75) Inventors: Tsung-Hsiu Wu, Hsin-Chu (TW);
Wen-Chung Yeh, Hsin-Chu (TW);
Ming-Nan Chuang, Hsin-Chu (TW)

(73) Assignee: Leadtrend Technology Corp., Science-Based Industrial Park, Hsin-Chu (TW)

(*) Notice: Subject to any disclaimer, the term of this patent is extended or adjusted under 35 U.S.C. 154(b) by 278 days.

(21) Appl. No.: 12/910,863

(22) Filed: Oct. 24, 2010

(65) Prior Publication Data

US 2011/0141778 A1 Jun. 16, 2011

(30) Foreign Application Priority Data

Dec. 16, 2009 (TW) .............................. 98143124 A

(51) Int. Cl.
*G05F 1/613* (2006.01)
(52) U.S. Cl.
USPC ............................ 323/222; 323/235; 323/285
(58) Field of Classification Search
USPC .................................. 323/222, 235, 285, 290
See application file for complete search history.

(56) References Cited

U.S. PATENT DOCUMENTS

| 5,180,964 | A | * | 1/1993 | Ewing | 323/222 |
| 6,163,139 | A | * | 12/2000 | Symonds | 323/222 |
| 6,434,029 | B1 | * | 8/2002 | Cyr et al. | 363/86 |
| 6,522,108 | B2 | * | 2/2003 | Prager et al. | 323/222 |
| 2008/0019161 | A1 | * | 1/2008 | Lee et al. | 363/89 |

FOREIGN PATENT DOCUMENTS

TW 200929829 7/2009

* cited by examiner

*Primary Examiner* — Adolf Berhane
*Assistant Examiner* — Fred E Finch, III
(74) *Attorney, Agent, or Firm* — Winston Hsu; Scott Margo

(57) ABSTRACT

A switch controller for switching power supply is coupled to an auxiliary winding of the switching power supply through a detecting resistor. The switch controller provides a detecting current passing through the detecting resistor for keeping the voltage level of a detecting signal transmitted by the detecting resistor higher than a predetermined voltage. In this way, the switch controller can avoid the latch-up phenomenon caused by receiving the detecting signal of the negative voltage level. In addition, the switch controller can detect the magnitude of an input voltage of the switching power supply by means of the detecting current, and accordingly control the operation of the switching power supply.

18 Claims, 8 Drawing Sheets

SWITCH CONTROLLER FOR SWITCHING POWER SUPPLY AND METHOD THEREOF

BACKGROUND OF THE INVENTION

1. Field of the Invention

The present invention is related to a switch controller, and more particularly, to a switch controller for switching power supply.

2. Description of the Prior Art

Applied in AC/DC converting switch power supplies, a common technique to detect the electrical energy held in the primary winding is by utilizing an auxiliary winding. By detecting the voltage across the auxiliary winding, the switch controller is able to determine the timing to turn on or turn off the power switch. For instances, when the switching power supply is utilized for power factor correction (PFC), one operation method is to provide a fixed on-time, i.e. fixed turned on time of power switch, for the power switch. After the power switch is off and the electrical energy held in the primary winding is depleted, the voltage of the auxiliary winding starts oscillating such that the voltage level drops; after the voltage level across the auxiliary winding is detected to be lowered to a certain degree, the current flow in the primary winding can then be deemed as zero and the power switch is turned on again so as to enter the next switch cycle.

However, since the auxiliary winding is coupled to the switch controller, when the voltage level across the auxiliary winding is negative, the switch controller may receive the negative voltage directly, resulting in the latch-up phenomenon and thus making the switch controller operate improperly.

SUMMARY OF THE INVENTION

An embodiment of the present invention discloses a switch controller applied in a switching power supply. The switching power supply comprises an auxiliary winding and a primary winding coupled to an input power source. The primary winding is controlled by a power switch to charge or discharge so as to generate an output power source. The switch controller comprises a driving circuit, a clamping circuit and a detecting circuit. The driving circuit is for turning on or turning off the power switch so as to charge or discharge the primary winding. The clamping circuit comprises a detecting end coupled to the auxiliary winding through a detecting resistor, wherein the detecting end is substantially maintained above a predetermined voltage using a detecting current. The detecting circuit is for generating a control signal according to the detecting current so as to control the driving circuit.

Another embodiment of the present invention discloses a switch controlling method, applied in a switching power supply. The switching power supply comprises an auxiliary winding and a primary winding coupled to an input power source. The primary winding is controlled by a power switch to charge or discharge so as to generate an output power source. The method comprises providing a detecting resistor having one end coupled to the auxiliary winding; clamping a voltage level of an other end of the detecting resistor to a predetermined voltage; detecting a detecting current flowing through the detecting resistor, the detecting current varied with the input power source so as to approximately correspond to a voltage level of the input power source; generating a control signal according to a magnitude of the detecting current; and determining to turn on or turn off the power switch according to the control signal so as to control the primary winding to perform charging or discharging.

These and other objectives of the present invention will no doubt become obvious to those of ordinary skill in the art after reading the following detailed description of the preferred embodiment that is illustrated in the various figures and drawings.

DETAILED DESCRIPTION

Therefore, an embodiment of the present invention provides a switch controller, coupled to the auxiliary winding via a detecting resistor, and the switch controller receives a detecting signal from the detecting resistor. The switch controller provides a detecting current flowing through the detecting resistor to remain voltage level of the detecting signal from the detecting resistor higher than a certain voltage level (i.e. such as 0V), so the latch-up phenomenon caused by the switch controller receiving the negative voltage can be prevented. Furthermore, the switch controller of the present invention can detect the voltage level of the input power source via the detecting current so as to control the power switch and the switching power supply accordingly.

Figure 1:
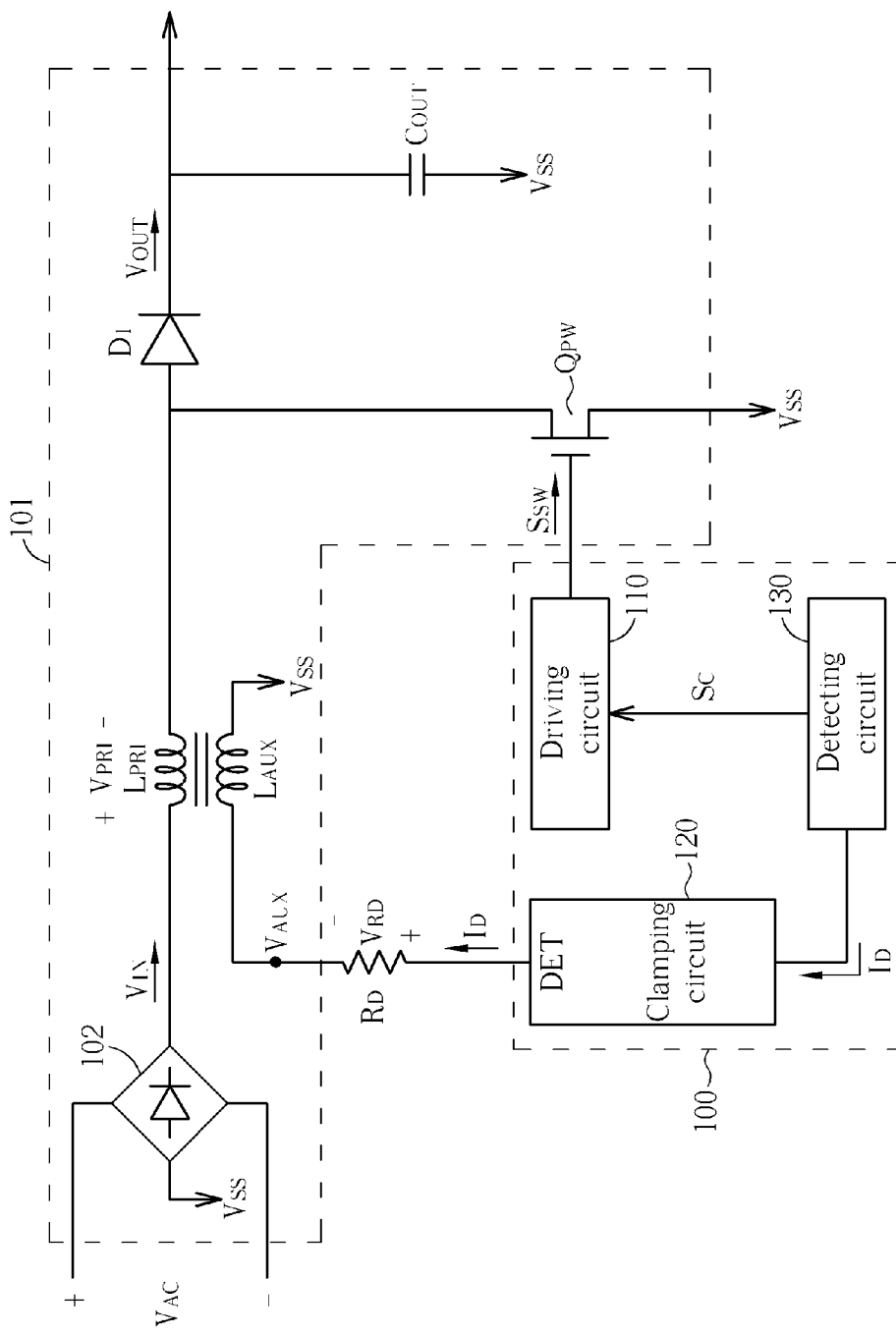
FIG. 1 is a diagram illustrating the switch controller for switching power supply of the boost converter architecture, according to an embodiment of the present invention.

FIG. 1 is a diagram illustrating switch controller 100 for switching power supply 101 of the boost converter architecture, according to an embodiment of the present invention. The present invention, however, is not only limited to the boost converter circuits, but also to other topologies, such as the flyback or the buck-boost converter. Switching power supply 101 comprises a primary winding $L_{PRI}$, an auxiliary winding $L_{AUX}$, a power switch $Q_{PW}$, a diode $D_1$, a capacitor $C_{OUT}$, and a rectifier 102. Rectifier 102 is utilized to rectify AC power source $V_{AC}$ to DC input power source $V_{IN}$, as illustrated in FIG. 1. Primary winding $L_{PRI}$ is coupled to input power source $V_{IN}$ and is controlled by power switch $Q_{PW}$ for charging or discharging; primary winding $L_{PRI}$ charges capacitor $C_{OUT}$ via diode $D_1$ so as to generate output power source $V_{OUT}$. One end of auxiliary winding $L_{AUX}$ is coupled to voltage source $V_{SS}$ (i.e. the ground), and the other end is coupled to a detecting resistor $R_D$. Since auxiliary voltage $V_{AUX}$ across auxiliary winding $L_{AUX}$ is proportional to primary voltage $V_{PR}$ across primary winding $L_{PRI}$, and the voltage level of primary voltage $V_{PRI}$ approximately equals that of input power source $V_{IN}$ when power switch $Q_{PW}$ grounds one end of primary winding $L_{PRI}$, the voltage level of auxiliary voltage $V_{AUX}$ therefore approximately corresponds to input power source $V_{IN}$.

Switch controller 100 comprises a driving circuit 110, a clamping circuit 120, and a detecting circuit 130. Driving circuit 110 outputs switch control signal $S_{SW}$. When switch control signal $S_{SW}$ is represented as "asserted", power switch $Q_{PW}$ is turned on and primary winding $L_{PRI}$ is under the charging state to increase the electrical energy stored in primary winding $L_{PRI}$; on the other hand, when switch control signal $S_{SW}$ is "disasserted", power switch $Q_{PW}$ is turned off and primary winding $L_{PRI}$ is under the discharging state, and thus the stored electrical energy is reduced. Clamping circuit 120 comprises a detecting end DET coupled to auxiliary winding $L_{AUX}$ via detecting resistor $R_D$. By utilizing clamping circuit 120, the voltage level of detecting end DET can be clamped to a predetermined value (e.g. 0V), so as to prevent the negative voltage entering switch controller 100.

Two circumstances may result in auxiliary voltage $V_{AUX}$ falling to the negative voltage level; one is that power switch $Q_{PW}$ is turned off and the electrical energy held in primary winding $L_{PRI}$ is depleted, causing the voltage level of auxiliary winding $L_{AUX}$ starting oscillating; the other is that power switch $Q_{AUX}$ is turned on to increase the electrical energy held in primary winding $L_{PW}$. Clamping circuit 120 can prevent the negative voltage from entering switch controller 100 in both of the circumstances.

When power switch $Q_{PW}$ is turned on, detecting circuit 130 generates control signal $S_C$ according to detecting current $I_D$ flowing through detecting resistor $R_D$ so as to control driving circuit 110. In addition, voltage $V_{RD}$ across detecting resistor $R_D$ is obtained by subtracting auxiliary voltage $V_{AUX}$ by the predetermined value at detecting end DET. Since auxiliary voltage $V_{AUX}$ approximately corresponds to the voltage level of input power source $V_{IN}$ when power switch $Q_{PW}$ is turned on, detecting circuit 130 is able to detect the voltage level of input power source $V_{IN}$ according to detecting current $I_D$.

Figure 2:
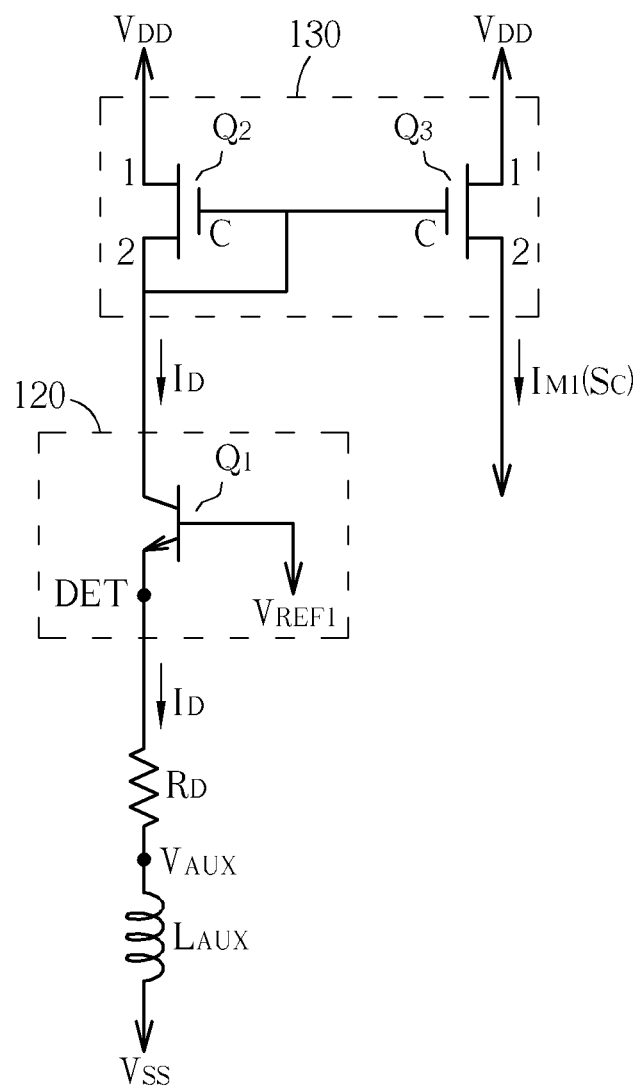
FIG. 2 is a diagram illustrating the clamping circuit and the detecting circuit according to an embodiment of the present invention.

FIG. 2 is a diagram illustrating clamping circuit 120 and detecting circuit 130 according to an embodiment of the present invention. Voltage source $V_{DD}$ is used to supply to power switch controller 100. Clamping circuit 120 comprises a transistor $Q_1$, realized with a BJT, MOSFET, or similar components and circuits. The base of transistor $Q_1$ is coupled to a voltage source $V_{REF1}$; the emitter of transistor $Q_1$ is coupled to detecting resistor $R_D$ and also acts as detecting end DET of clamping circuit 120. Voltage source $V_{REF1}$ is used to supply a reference voltage; for instances, if reference voltage is 0.7V, the minimum voltage level of detecting end DET is approximately 0V ($\sim$0.7V$-V_{BE-ON}$), solving the problem of detecting end DET receiving the negative voltage and preventing the latch-up phenomenon for switch controller 100.

Detecting circuit 130 comprises a current mirror which comprises transistors $Q_2$ and $Q_3$. Reflecting current $I_{M1}$ flowing through transistor $Q_3$ is proportional to detecting current $I_D$. As the above-mentioned description of FIG. 1, the magnitude of detecting current $I_D$ approximately corresponds to the voltage level of input power source $V_{IN}$, and hence the magnitude of reflecting current $I_{M1}$ also corresponds approximately to the voltage level of input power source $V_{IN}$. Accordingly, detecting circuit 130 outputs reflecting current $I_{M1}$ as control signal $S_C$ to control driving circuit 110.

Figure 3:
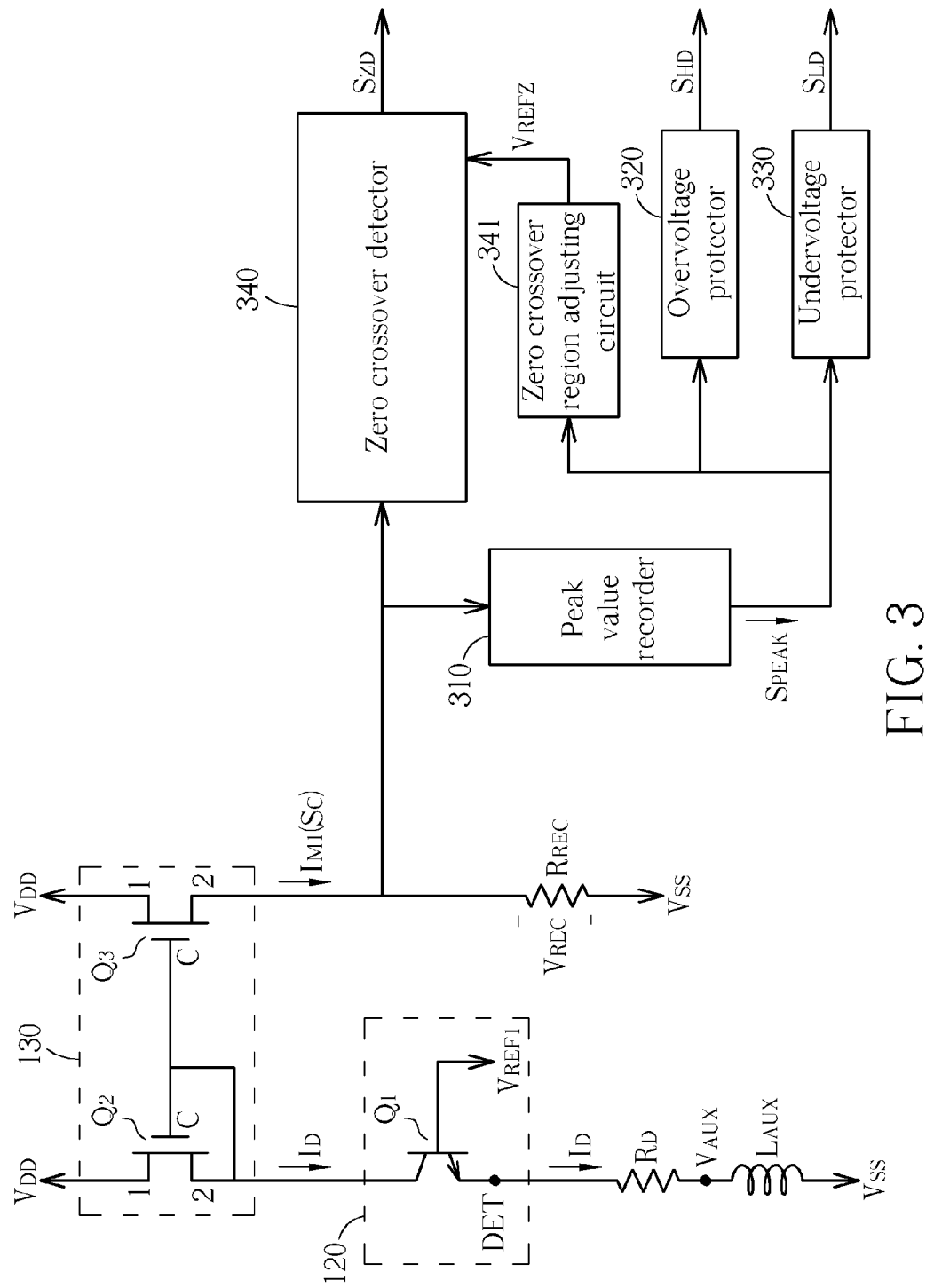
FIG. 3 is a diagram illustrating the switch controller utilizing the reflecting current to control the operation of the switching power supply according to the first embodiment of the present invention.
Figure 4:
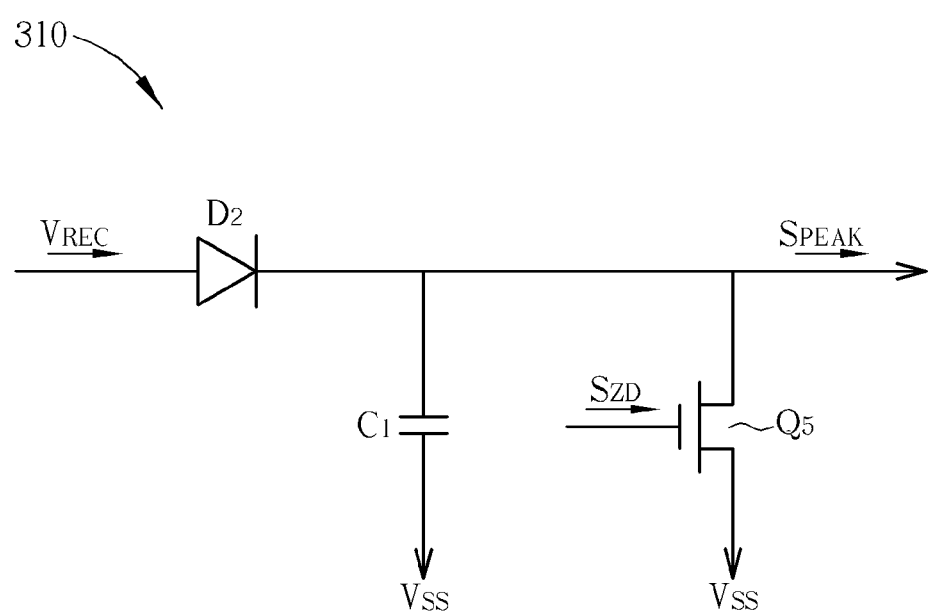
FIG. 4 is a diagram illustrating the analog peak value recorder according to an embodiment of the present invention.
Figure 5:
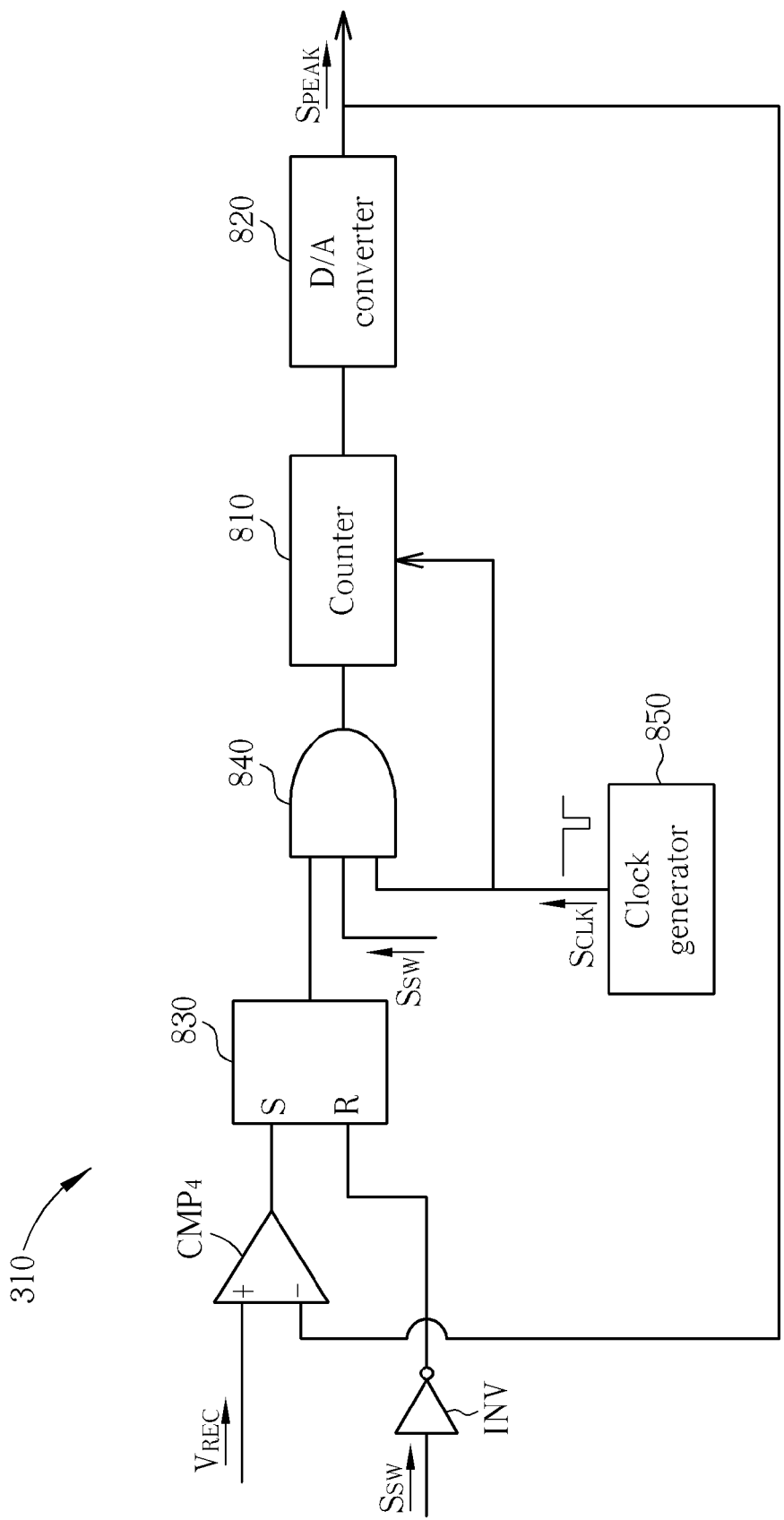
FIG. 5 is a diagram illustrating the digital peak value recorder according to an embodiment of the present invention.

FIG. 3 is a diagram illustrating switch controller 100 utilizing reflecting current $I_{M1}$ to control switching power supply 101 according to the first embodiment of the present invention. Reflecting current $I_{M1}$ generated by detecting circuit 130 flows through a recording resistor $R_{REC}$. Since the magnitude of reflecting current $I_{M1}$ approximately corresponds to the voltage level of input power source $V_{IN}$, voltage $V_{REC}$ across recording resistor $R_{REC}$ is also approximately proportional to the voltage level of input power source $V_{IN}$. Switch controller 100 further comprises a peak value recorder 310 coupled to recording resistor $R_{REC}$, used to detect the peak value of voltage $V_{REC}$ across recording resistor $R_{REC}$ so as to generate a peak value signal $S_{PEAK}$. Since voltage $V_{REC}$ across recording resistor $R_{REC}$ is approximately in proportion to the voltage level of input power source $V_{IN}$, peak value signal $S_{PEAK}$ approximately corresponds to the peak voltage of input power source $V_{IN}$ consequently. As shown in FIG. 4, peak value recorder 310 can be realized with analog circuits, comprising diode $D_2$, capacitor $C_1$ and transistor $Q_5$. As shown in FIG. 5, peak value recorder 310 can also be realized with digital circuits comprising comparator $CMP_4$, counter 810, digital-to-analog converter 820, SR flip-flop 830, AND gate 840, clock generator 850, and inverter INV, wherein clock generator 850 generates clock signal $S_{CLK}$. The frequency of clock signal $S_{CLK}$ is typically less than 50 Hz. Clock signal $S_{CLK}$ is utilized to reset counter 810 (i.e. reset counter 810 back to a value such as zero) to make peak value recorder 310 determine the peak voltage of input power source $V_{IN}$ again. In principle, counter 810 continues to up count until peak value signal $S_{PEAK}$ is not less than voltage $V_{REC}$. Since the operation principle of peak value recorders 310 illustrated in FIG. 4 and FIG. 5 are familiar by those skilled in the art, the relative description is therefore omitted hereafter.

In the embodiment of FIG. 3, switch controller 100 further comprises an undervoltage protector 330, for determining whether the voltage level of input power source $V_{IN}$ is in an undervoltage protection region. The undervoltage protection for input power source $V_{IN}$ is generally called brownout protection. For instances, undervoltage protector 330 can be realized with a comparator, comparing peak value signal $S_{PEAK}$ and a reference voltage $V_{REFL}$, where if the voltage level of peak value signal $S_{PEAK}$ is lower than reference voltage $V_{REFL}$, undervoltage protector 330 determines the voltage level of input power source $V_{IN}$ is in the undervoltage protection region, so undervoltage protector 330 outputs undervoltage detecting signal $S_{LD}$ to driving circuit 110 (driving circuit 110 is not shown in FIG. 3) to turn off switching power supply 101.

In another embodiment of the present invention, switch controller 100 further comprises an overvoltage protector 320. Similarly, overvoltage protector 320 determines the voltage level of input power source $V_{IN}$ reaches an overvoltage protection region according to peak value signal $S_{PEAK}$ and outputs overvoltage detecting signal $S_{HD}$ to driving circuit 110 to turn off switching power supply 101.

Switching power supply 101 can be utilized for power factor correction (PFC). In the embodiment of FIG. 3, switch controller 100 further comprises a zero crossover detector 340 coupled to recording resistor $R_{REC}$ to determine whether input power source $V_{IN}$ has entered a zero crossover region according to voltage $V_{REC}$ across recording resistor $R_{REC}$. Zero crossover signal $S_{ZD}$ is then outputted to driving circuit 110 to adjust the turned on or turned off time of power switch $Q_{PW}$. The detail operations regarding the zero crossover are disclosed in another Taiwan patent application of the application No. 097131900. For instances, when voltage $V_{REC}$ is less than a zero-cross reference voltage $V_{REFZ}$, input power source $V_{IN}$ is determined as entering into the zero crossover region. Furthermore, if input power source $V_{IN}$ does not enter into the zero crossover region, the on-time of power switch $Q_{PW}$ can be approximately set to a constant value, for example; when input power source $V_{IN}$ enters into the zero crossover region, on-time of power switch $Q_{PW}$ can be set to another larger constant value.

Moreover, zero crossover signal $S_{ZD}$ can be utilized to periodically reset peak value recorder 310, so whenever input power source $V_{IN}$ has entered the zero crossover region, peak value recorder 310 can start tracing the peak voltage of input power source $V_{IN}$ again. For instances, as illustrated in FIG. 4, transistor $Q_5$ of analog peak value recorder 310 resets voltage across capacitor $C_1$ according to zero crossover signal $S_{ZD}$. As illustrated in FIG. 5, counter 810 of digital peak value recorder 310 can be reset (i.e. reset a value such as zero) according to zero crossover zone signal $S_{ZD}$ and, clock generator 850 can be omitted because zero crossover zone signal $S_{ZD}$ may replace clock signal $S_{CLK}$.

In the embodiment of FIG. 3, switch controller 100 further comprises a zero crossover region adjusting circuit 341, for determining zero-cross reference voltage $V_{REFZ}$ based on peak value signal $S_{PEAK}$ generated by peak value recorder 310. For instances, when zero crossover region adjusting circuit 341 determines the voltage level of input power source $V_{IN}$ is 110V or 220V, zero crossover region adjusting circuit 341 sets zero-cross reference voltage $V_{REFZ}$ to be 30V or 60V respectively. In other words, zero crossover region adjusting circuit 341 adjusts the criterion of the zero crossover region according to the magnitude of input power source $V_{IN}$. This way, the zero crossover region can be sustained approximately for a constant proportion in the whole switching cycle (i.e. around 60 Hz) of AC power source $V_{AC}$.

Figure 6:
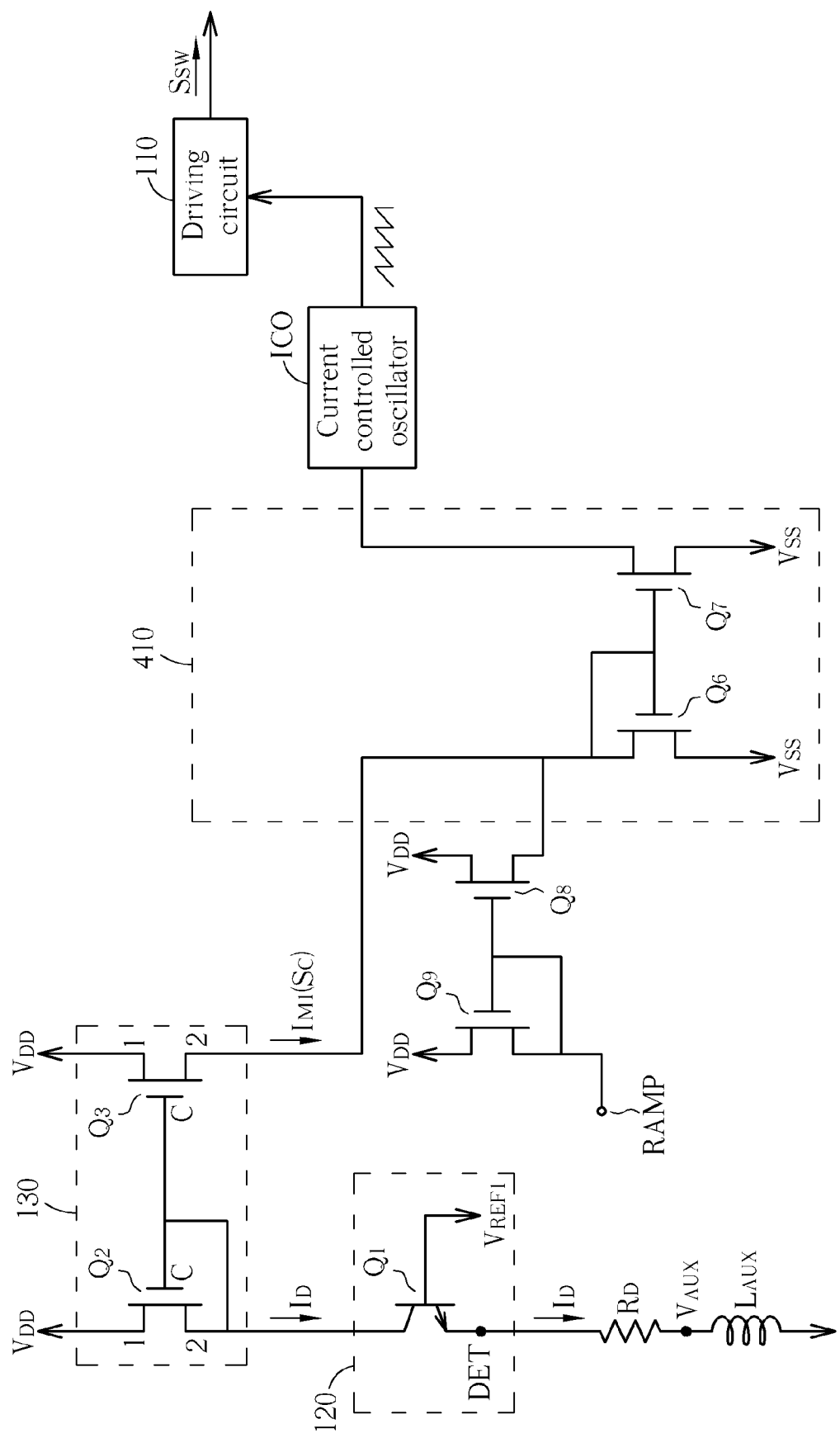
FIG. 6 is a diagram illustrating the switch controller utilizing the reflecting current to control the operation of the switching power supply according to another embodiment of the present invention.

FIG. 6 is a diagram illustrating switch controller 100 utilizing reflecting current $I_{M1}$ to control switching power supply 101 according to another embodiment of the present invention. Switch controller 100 further comprises a switch fine-tuning circuit 410 coupled to the current mirror of transistors $Q_2$ and $Q_3$. Driving circuit 110 outputs switch control signal $S_{SW}$ to control power switch $Q_{PW}$ according to the ramping signal generated from a current controlled oscillator ICO. Basically, the frequency of the ramping signal is constant and can be determined, for instance, by coupling an external resistor to pin RAMP of switch controller 100. Switch fine-tuning circuit 410 can adjust the ascent or descent rate of the ramping signal according to reflecting current $I_{M1}$, so the on-time of power switch $Q_{PW}$ varies with input power source $V_{IN}$. For instances, the higher the voltage level of input power source $V_{IN}$, the higher the reflecting current $I_{M1}$, the higher the current supplied to current controlled oscillator ICO, the higher the ascending rate of the ramping signal, and the shorter the on-time of power switch $Q_{PW}$. On the contrary, the lower the voltage level of input power source $V_{IN}$, the longer the on-time of power switch $Q_{PW}$. Therefore, the on-time of power switch $Q_{PW}$ may be slightly varied with input power source $V_{IN}$, achieving the effect of improving the power factor.

Figure 7:
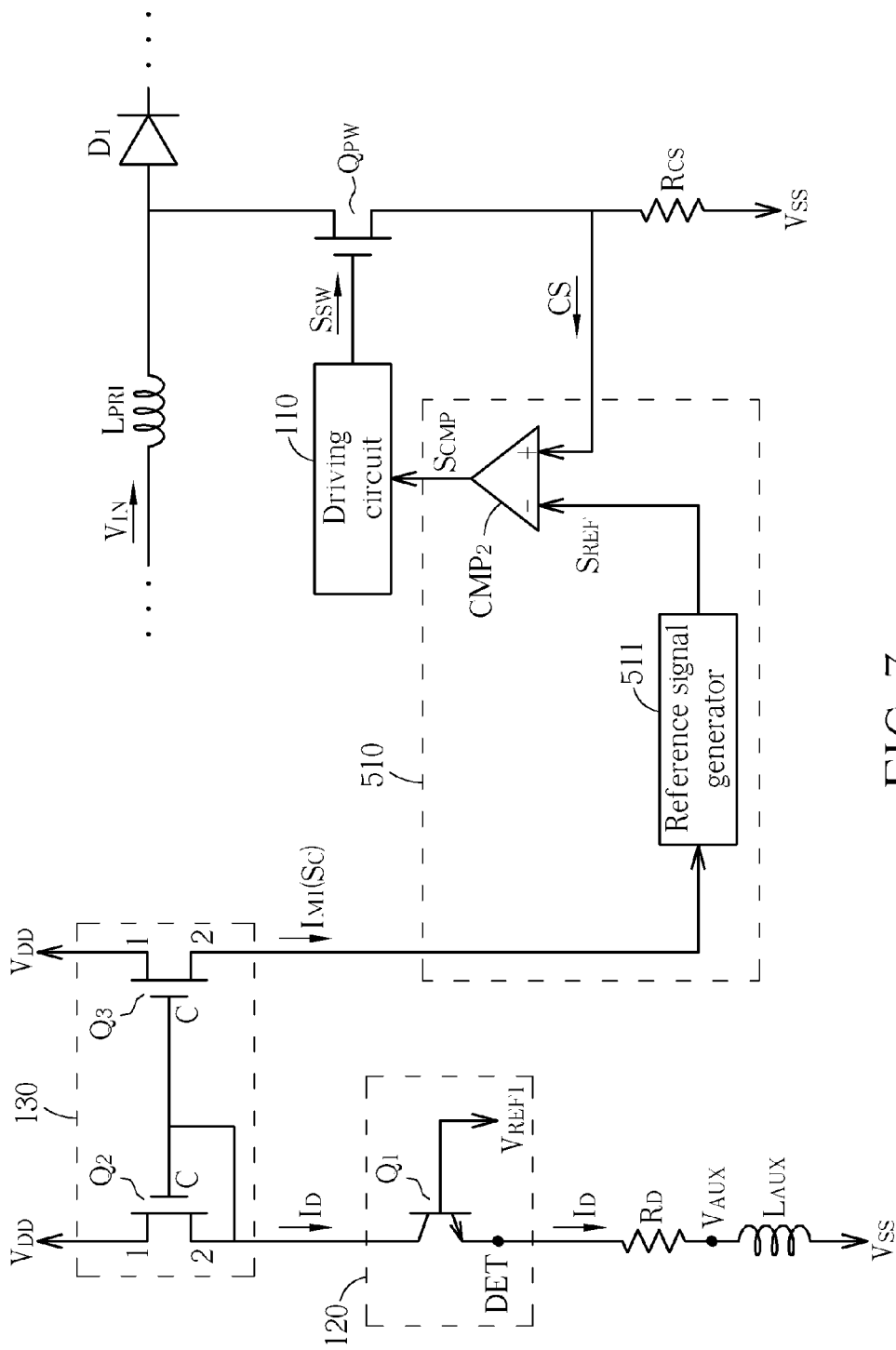
FIG. 7 is a diagram illustrating the switch controller utilizing the reflecting current to control the operation of the switching power supply according to another embodiment of the present invention.

FIG. 7 is a diagram illustrating switch controller 100 utilizing reflecting current $I_{M1}$ to control switching power supply 101 according to another embodiment of the present invention. In this embodiment, switching power supply 101 further comprises a current detecting resistor $R_{CS}$ coupled to power switch $Q_{PW}$. When power switch $Q_{PW}$ is turned on, the current flowing through primary winding $V_{PRI}$ also flows through current detecting resistor $R_{CS}$, so the voltage as current detecting signal CS across current detecting resistor $R_{CS}$ corresponds to the magnitude of the current flowing through primary winding $L_{PRI}$. Switch controller 100 further comprises an over current protection device 510 coupled to detecting circuit 130. Over current protection device 510 comprises a reference signal generator 511 and a comparator $CMP_2$. Reference signal generator 511 provides reference signal $S_{REF}$ according to reflecting current $I_{M1}$. Comparator $CMP_2$ compares reference signal $S_{REF}$ and current detecting signal CS, then outputting comparing signal $S_{CMP}$ to driving circuit 110 to determine the timing of turning off power switch $Q_{PW}$. For instances, when current detecting signal CS exceeds reference signal $S_{REF}$, meaning that the current flowing through primary winding $L_{PRI}$ is too high, comparator $CMP_2$ outputs comparing signal $S_{CMP}$ representing "over current" to driving circuit 110 to turn off power switch $Q_{PW}$. Generally, a delay period exists from driving circuit 110 starting to turn off power switch $Q_{PW}$ to power switch $Q_{PW}$ being completely turned off. Since the current flowing through primary winding $L_{PRI}$ varies with input power source $V_{IN}$, peak value of current detecting signal CS also varies with input power source $V_{IN}$, resulting in driving circuit 110 hard to perform the over current protection mechanism accurately. In the present embodiment, over current protection device 510 allows driving circuit 110 to determine the timing to turn off power switch $Q_{PW}$ according to input power source $V_{IN}$. For instances, when reference signal generator 511, according to reflecting current $I_{M1}$, determines the voltage level of input power source $V_{IN}$ increased, reference signal generator 511 lowers the voltage level of reference signal $S_{REF}$, and vice versa. Therefore driving circuit 110 can perform over current protection with higher accuracy, making the maximum power converted by primary winding $L_{PRI}$ approximately maintain to a constant value that does not vary with the voltage level of input power source $V_{IN}$.

Figure 8:
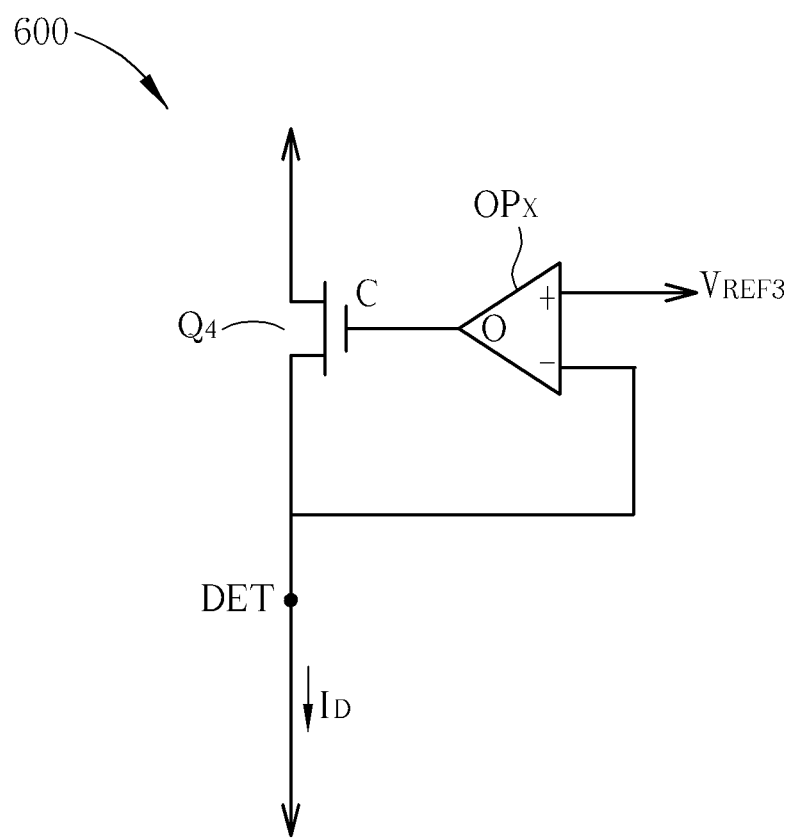
FIG. 8 is a diagram illustrating the clamping circuit which is another embodiment of the clamping circuit 120 of FIG. 1.

FIG. 8 is a diagram illustrating another embodiment of clamping circuit 120 of FIG. 1. Clamping circuit 600 comprises a transistor $Q_4$ and an operational amplifier $OP_x$. As known in the art, clamping circuit 600, which uses negative feedback, could maintain the voltage level of detecting end DET to be above the predetermined voltage $V_{REF3}$.

In conclusion, the switch controller in one embodiment of the present invention is coupled to the auxiliary winding through a detecting resistor. The switch controller provides a detecting current which flows through the detecting resistor to maintain a detecting signal transmitted from the detecting resistor to be above a certain voltage level (such as 0V), so the switch controller can avoid the latch-up phenomenon caused by receiving the detecting signal of the negative voltage level. Furthermore, the switch controller can control the operation of the power switch and the switching power supply according to the voltage level of the input power source, providing users with great convenience.

Those skilled in the art will readily observe that numerous modifications and alterations of the device and method may be made while retaining the teachings of the invention.

What is claimed is:

1. A switch controller applied in a switching power supply, the switching power supply comprising an auxiliary winding and a primary winding coupled to an input power source, the primary winding controlled by a power switch to charge or discharge so as to generate an output power source, the switch controller comprising:
   a driving circuit, for turning on or turning off the power switch so as to charge or discharge the primary winding;
   a clamping circuit, comprising a detecting end coupled to the auxiliary winding through a detecting resistor, wherein the detecting end is substantially maintained above a predetermined voltage using a detecting current; and a detecting circuit, for generating a control signal according to the detecting current so as to control the driving circuit, comprising:
a current mirror to provide the detecting current and a reflecting current, the reflecting current is proportional to the detecting current, and the detecting current flows through the detecting resistor across which a voltage approximately corresponds to a voltage level of the input power source.

2. The switch controller of claim 1, wherein the reflecting current flows through a recording resistor, and the voltage across the recording resistor is approximately in proportion to the voltage level of the input power source.

3. The switch controller of claim 2, further comprising a peak value recorder coupled to the recording resistor, for detecting a peak voltage of the voltage across the recording resistor and thus recording a peak value signal, wherein the peak value signal approximately corresponds to a peak voltage of the input power source.

4. The switch controller of claim 3, further comprising an undervoltage protector coupled to the peak value recorder, for determining the input power source in an undervoltage protection region according to the peak value signal, and then outputting an undervoltage detecting signal to the driving circuit to turn off the switching power supply.

5. The switch controller of claim 3, further comprising an overvoltage protector coupled to the peak value recorder, for determining the input power source in an overvoltage protection region according to the peak value signal, and then outputting an overvoltage detecting signal to the driving circuit to turn off the switching power supply.

6. The switch controller of claim 1, further comprising a zero crossover region detector coupled to the detecting circuit, for outputting a zero crossover region signal to the driving circuit according to the control signal, and adjusting a turned on time or turned off time of the power switch, wherein the zero crossover region signal represents an input power source entering a zero crossover region.

7. The switch controller of claim 6, further comprising a zero crossover region adjusting circuit, for adjusting a criterion according to a peak voltage of the input power source, wherein the zero crossover region detector uses the criterion to determine whether the input power source enters into the zero crossover region.

8. The switch controller of claim 1, further comprising a switch fine-tuning circuit coupled to the current mirror, wherein the switch fine-tuning circuit adjusts a turned on time or turned off time of the power switch according to the reflecting current.

9. The switch controller of claim 8, wherein the driving circuit generates a switch control signal to turn on or turn off the power switch according to a ramping signal generated from a current controlled oscillator; the switch fine-tuning circuit adjusts a ascent or descent rate of the ramping signal according to the reflecting current so as to adjust the turned on time or turned off time of the power switch.

10. The switch controller of claim 1, wherein the clamping circuit comprises:
a bipolar junction transistor (BJT), having an emitter coupled to the detecting resistor; and
a voltage source, coupled to a base of the BJT, for stabilizing the BJT to operate in a certain operation mode.

11. The switch controller of claim 10, wherein a voltage level of the emitter of the BJT is approximately zero.

12. A switch controlling method, applied in a switching power supply, the switching power supply comprising an auxiliary winding and a primary winding coupled to an input power source, the primary winding controlled by a power switch to charge or discharge so as to generate an output power source, the method comprising:
providing a detecting resistor having one end coupled to the auxiliary winding;
clamping a voltage level of an other end of the detecting resistor to a predetermined voltage;
detecting a detecting current flowing through the detecting resistor, the detecting current varied with the input power source so as to approximately correspond to a voltage level of the input power source;
generating a control signal according to a magnitude of the detecting current; and
determining to turn on or turn off the power switch according to the control signal so as to control the primary winding to perform charging or discharging;
wherein the detecting the detecting current flowing through the detecting resistor comprises:
providing a current mirror to provide a reflecting current in proportion to the detecting current; and
making the reflecting current flow through a recording resistor to form a voltage across the recording resistor, which corresponds to the voltage level of the input power source.

13. The switch controlling method of claim 12, further comprising:
determining the input power source entering into a zero crossover region according to the voltage across the recording resistor, and then adjusting a turned on time or turned off time of the power switch.

14. The switch controlling method of claim 13, further comprising:
recording a peak value signal of the voltage across the recording resistor, the peak value signal approximately corresponding to a peak voltage of the input power source; and
determining the peak voltage of the input power source according to the peak value signal so as to adjust a criterion used to determine the input power source entering into the zero crossover region.

15. The switch controlling method of claim 14, further comprising:
determining the voltage level of the input power source in an overvoltage protection region according to the peak value signal; and
when the voltage level of the input power source is in the overvoltage protection region, the switching power supply is turned off.

16. The switch controlling method of claim 12, further comprising:
recording a peak value signal of the voltage across the recording resistor, the peak value signal approximately corresponding to a peak voltage of the input power source.

17. The switch controlling method of claim 16, further comprising:
determining the voltage level of the input power source in an undervoltage protection region according to the peak value signal; and
when the voltage level of the input power source is in the undervoltage protection zone, the switching power supply is turned off.

18. The switch controlling method of claim 12, further comprising:

adjusting a turned on time or turned off time of the power switch, according to the reflecting current.

* * * * *